United States Patent [19]

Campbell et al.

[11] Patent Number: 5,084,092
[45] Date of Patent: Jan. 28, 1992

[54] METHOD OF SEPARATING METALS FROM CATALYST MATERIAL

[75] Inventors: David A. Campbell, Middlesex; Nicholas P. Wilkinson, Surrey, both of England

[73] Assignee: The British Petroleum Company p.l.c., London, England

[21] Appl. No.: 232,984

[22] Filed: Aug. 16, 1988

[30] Foreign Application Priority Data

Aug. 21, 1987 [GB] United Kingdom ............... 8719840

[51] Int. Cl.$^5$ .................. C22B 11/00; B01J 23/96; B01J 38/18
[52] U.S. Cl. ...................... 75/421; 75/633; 502/22; 502/27; 502/50
[58] Field of Search ............ 502/23, 24, 38, 50, 502/22, 27; 75/83, 421, 633, 720; 423/22

[56] References Cited

U.S. PATENT DOCUMENTS

| | | | |
|---|---|---|---|
| 2,854,400 | 9/1958 | Weisz | 75/83 |
| 3,230,179 | 1/1966 | Schwarzenbek | 502/50 |
| 3,400,073 | 6/1968 | Schwarzenbek | 208/140 |
| 3,642,656 | 10/1969 | Hayes | 502/50 |
| 3,654,182 | 11/1969 | Hayes | 502/37 |
| 3,997,337 | 12/1976 | Pittie et al. | 75/121 |
| 4,123,500 | 10/1978 | Acres et al. | 502/23 |
| 4,331,557 | 5/1982 | Drake | 502/53 |
| 4,650,780 | 3/1987 | Krishnamaur | 502/50 |

FOREIGN PATENT DOCUMENTS

| | | |
|---|---|---|
| 784229 | 10/1957 | Brazil . |
| 0120655 | 10/1984 | European Pat. Off. . |
| 946288 | 7/1956 | Fed. Rep. of Germany . |
| 1175442 | 8/1964 | Fed. Rep. of Germany . |
| 2508906 | 9/1975 | Fed. Rep. of Germany . |
| 56-160332 | 12/1981 | Japan . |
| 57-082122 | 5/1982 | Japan . |
| 58-198439 | 11/1983 | Japan . |
| 59-056535 | 4/1984 | Japan . |
| 223138 | 10/1986 | Japan ............ 75/83 |
| 7208997 | 7/1971 | Netherlands . |
| 6708086 | 11/1976 | Netherlands . |
| 1493933 | 11/1977 | United Kingdom . |

*Primary Examiner*—Paul E. Konopka
*Attorney, Agent, or Firm*—Larry W. Evans; Joseph G. Curatolo; Teresan W. Gilbert

[57] ABSTRACT

A method of separating metals from carbon-supported catalyst materials comprises the steps of combusting the carbon at a temperature insufficient to cause volatisation of the metal followed by reduction with hydrogen of any oxidised metal and washing with acid or water.

6 Claims, 1 Drawing Sheet

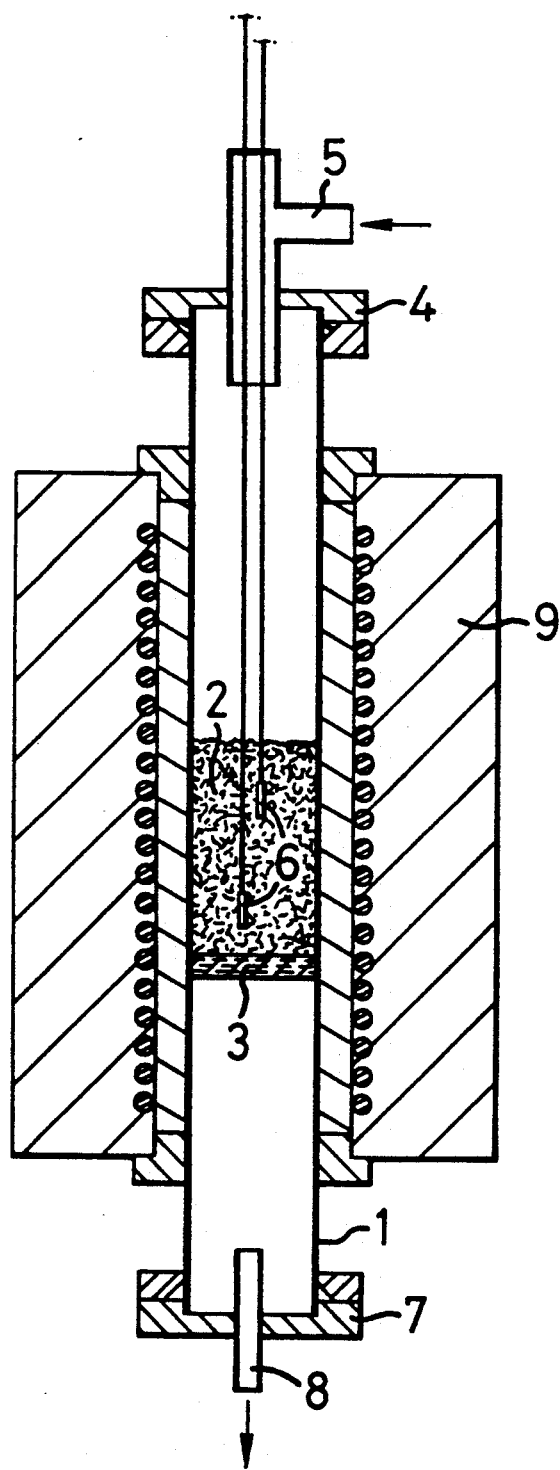

METHOD OF SEPARATING METALS FROM CATALYST MATERIAL

The present invention relates to the separation of metals from catalyst materials and more particularly relates to the separation of metals from carbon-supported catalyst materials.

Many catalyst materials comprise a supporting medium carrying a metal or metal compound. When a catalyst is no longer effective in a reaction process, it is often desirable to recover the metal or metal compound. This is particularly the case for relatively precious metals. However, known techniques are sometimes unsatisfactory in their ability to separate the components. The present invention relates to an improved process for the separation of valuable metals from a carbon supported catalyst material.

Thus, according to the present invention there is provided a method for separating metals from carbon-supported catalyst materials, the method comprising:

(a) contacting the catalyst material with an oxygen containing gas at a temperature sufficient to promote combustion of the carbon support but insufficient to cause volatilization of the metals and their compounds, (b) contacting the resultant material from step (a) with hydrogen at a temperature sufficient to promote reduction of any metals oxidised in the preceding step but insufficient to cause volatilization of the metals and their compounds, and (c) washing the resultant residue from step (b) with acid or water.

The final residue from step (c) is preferably washed and dried prior to further purification by conventional means, if desired. The metals preferably comprise an oxidisable platinum group metal and most preferably comprise ruthenium. Metal compounds may also be present, for example, barium carbonate and caesium carbonate. Preferably these compounds are not volatile below about 600° C. and most preferably they are beneficial in the combustion of the carbon support, for example caesium carbonate. Other support materials may also be present, in addition to the carbon.

In step (a) the preferred temperature is between 350° C. and 550° C. The rate of oxygen containing gas flow is adjusted to maintain the temperature in the preferred range having regard to the exothermic nature of the combustion. The oxygen containing gas may be oxygen diluted with a non-reactive gas such as nitrogen or is preferably, air. In step (b) the preferred temperature is between 200° and 250° C. The rate of hydrogen flow is maintained to achieve reduction of any oxidised metals. The hydrogen may be diluted with a non-reactive gas such as nitrogen or helium. At the end of steps (a) and (b) the material may be purged, whilst being cooled, with a non-reactive gas such as nitrogen, to displace oxygen or hydrogen prior to subsequent steps.

The final residue from step (c) may be washed with a mineral acid such as hydrochloric acid or with an organic acid such as acetic acid, a suitable concentration being 1 molar strength in aqueous solution. These acids remove salts such as caesium and barium carbonates, if present. Alternatively, the use of distilled water alone removes salts such as caesium carbonate, if present.

The invention will now be described by way of example only and with reference to the accompanying drawing.

BRIEF DESCRIPTION OF THE DRAWING

The drawing shows in cross-section a vertical tube-reactor which was used to treat the catalyst material by the method according to the invention.

The reactor tube (1) was made of alumina or Pyrex (a registered trade mark). The catalyst material (2) was supported by a support (3) which was either a plug of Saffil wool or a No. 2 glass sinter. A flange (4) at the top end of the reactor was adapted for connection of a gas inlet (5) and insertion of two thermocouples (6). A flange (7) at the bottom of the reactor tube (1) connected with a gas outlet (8). The reactor tube (1) was enclosed in an electrical furnace (9).

A sample of spent ammonia synthesis catalyst was used for all the examples described herein. The composition (as determined by an X-ray fluorescence technique) was: ruthenium 0.1 to 50 parts per 100 parts by weight of carbon; combined total of caesium and barium between 0.005 and 0.1 moles per mole of carbon.

The experiments were carried out at atmospheric pressure. The high exothermicity of reaction, rapid reaction kinetics and low heat loss caused very rapid heating when air was passed over the catalyst. The temperature of the bed was kept within the range 350°-550° C. The experimental conditions are given in Table 1 and the analytical results are summarised in Table 2. The residues and leach liquors were analysed by atomic absorption spectroscopy.

EXAMPLE 1

A sample of catalyst (30 g) was heated at 350° C. under a flow of nitrogen (80 cm$^3$ min$^{-1}$) for 1 hour and then at 300°-350° C. under a flow of air (400 cm$^3$ min$^{-1}$) for 8 hours. The residue obtained (RES-1), was divided into two portions, one of which was washed in water (RES-1W) the other washed in 1M aqueous hydrochloric acid (RES-1H). The analysis of the residues and wash solutions showed that ruthenium recovery to RES-1W was 90% while RES-1 H gave a recovery of only 60%. The remainder of the ruthenium was assumed to have passed into the wash solution (although mass balances are not complete). It was assumed that the ruthenium in the residue was present in an oxidised state and that this was easily leached by the hydrochloric acid. A sample of RES-1 was reduced in a thermobalance under a flow of hydrogen. The thermogravimetric trace showed that after some loss of moisture there was a decrease in weight due to reduction of the ruthenium dioxide i.e.:

$$RuO_2(s) + 2H_2(g) = Ru(s) + 2H_2O(g)$$

and the differential thermal analysis trace showed characteristic exotherms due to reduction.

EXAMPLE 2

In Experiment 2, some of the residue after combustion (RES-2) was reduced in a stream of hydrogen, at a temperature of 220° C. This residue (RES-2R) was then washed in hydrochloric acid to remove caesium and barium. The final residue (RES-2RH) was analysed for ruthenium and was found to be 95% pure ruthenium with a recovery of 95% into this phase. However, there was still about 2% in solution (X-ray diffraction analysis showed mainly ruthenium with a trace of barium sulphate).

The unreduced residue, RES-2H, showed a ruthenium recovery of 62.5% at a product purity of 71%.

TABLE 1

EXPERIMENTAL CONDITIONS

| Experiment | Combustion | Reduction | Wash |
|---|---|---|---|
| 1 | 30 g catalyst<br>(i) $N_2/80$ cm$^3$/min$^{-1}$/350° C./1 h<br>(ii) air/400 cm$^3$min$^{-1}$/300–350° C./<br>8 h = 13.2 g RES-1 | | 5.8 g RES-1/150 cm$^3$ HCl/7<br>h* = 1.27 g RES-1H<br>6.0 g RES-1/150 cm$^3$ H$_2$O/<br>7 h = 1.75 g RES-1W |
| 2 | 30 g catalyst<br>(i) $N_2/80$ cm$^3$min$^{-1}$/350° C./1 h<br>(ii) air/500 cm$^3$min$^{-1}$/350–450° C./1 h<br>(iii) air/100 cm$^3$min$^{-1}$/400° C./<br>1 h = 12.2 g RES-2 | 5.07 g RES-2/H$_2$/20 cm$^3$min/220° C./<br>2 h = 4.85 g RES-2R | 4.5 g RES-2R/150 cm$^3$ HCl/<br>7 h = 0.71 g RES-2RH<br>4.52 g RES-2/150 cm$^3$ HCl/<br>7 h = 0.60 g RES-2H |

*Concentration of HCl used = 1M

TABLE 2

ANALYTICAL RESULTS

| Experiment | Residue | Ruthenium (%) | | | |
|---|---|---|---|---|---|
| | | Residue Purity Analysis | Recovery into Residue | Recovery into Solution | Total Recovery |
| 1 | RES-1H | 38.0 | 57.6 | 27.2 | 84.8 |
|   | RES-1W | 43.0 | 90.2 | 1.6 | 91.8 |
| 2 | RES-2RH | 95.0 | 95.0 | 2.6 | 97.6 |
|   | RES-2H | 71.0 | 62.5 | 35.2 | 97.7 |

We claim:

1. A method for separating one or more oxidizable platinum group metals from carbon-supported catalyst materials comprises the steps:

(a) contacting the catalyst material with an oxygen containing gas at a temperature between about 350° C. and about 550° C. to combust the carbon support, (b) contacting the resultant material from step (a) with hydrogen at a temperature between about 200° C. and about 250° C. to reduce any metals oxidised in step (a), and (c) washing the resultant residue from step (b) with acid to remove any acid-soluble salts.

2. A method according to claim 1 in which the oxidizable platinum group metal comprises ruthenium.

3. A method according to claim 2 in which the catalyst material comprises a barium compound.

4. A method according to claim 2 in which the catalyst material comprises a caesium compound.

5. A method according to claim 1 in which the catalyst material comprises a barium compound.

6. A method according to claim 1 in which the catalyst material comprises a caesium compound.

* * * * *